Dec. 19, 1961   W. A. COMPTON   3,013,641
STRUCTURAL ELEMENT
Filed April 29, 1957   2 Sheets-Sheet 1
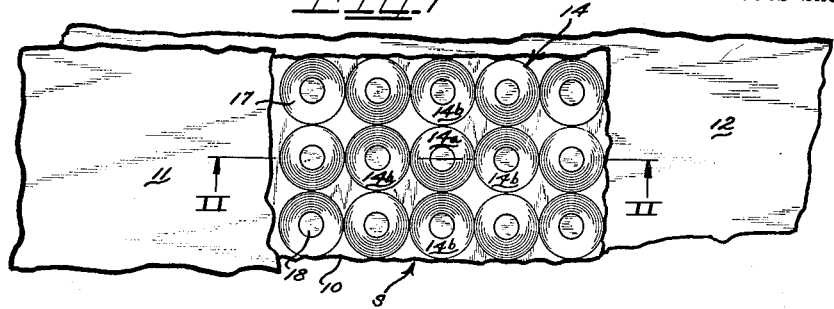
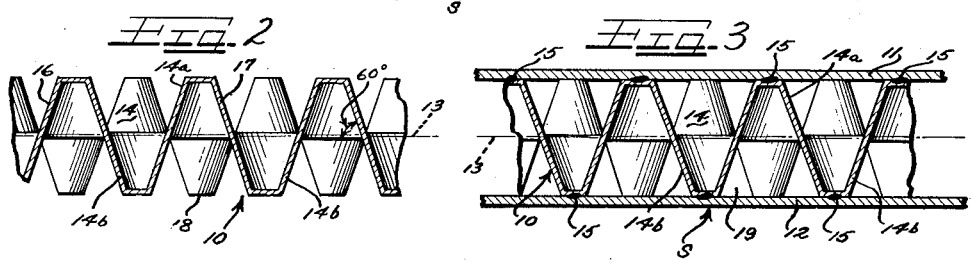
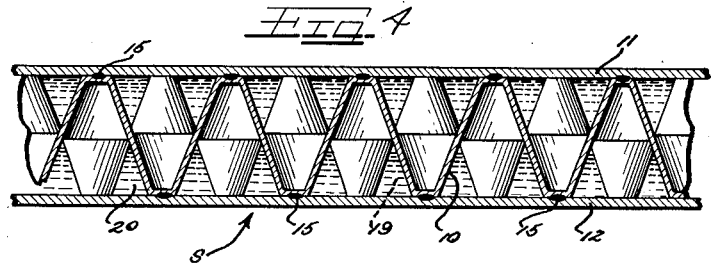
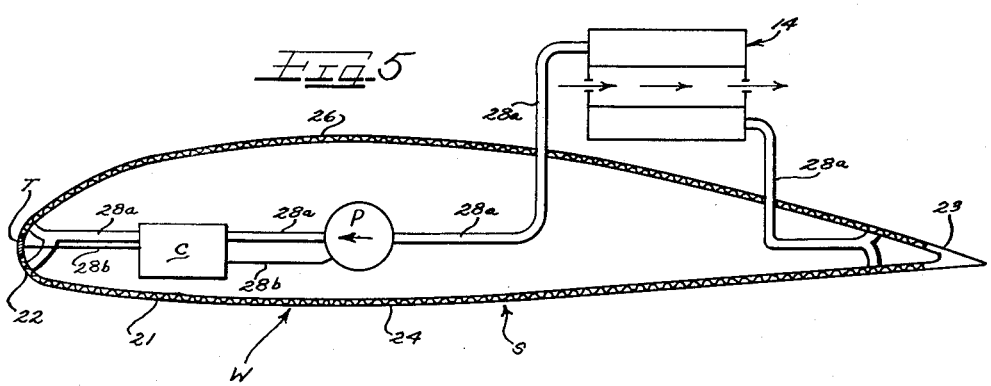
Inventor
WILLIAM A. COMPTON
By Hill, Sherman, Meroni, Gross & Simpson
Attys Dec. 19, 1961 W. A. COMPTON 3,013,641
STRUCTURAL ELEMENT
Filed April 29, 1957 2 Sheets-Sheet 2
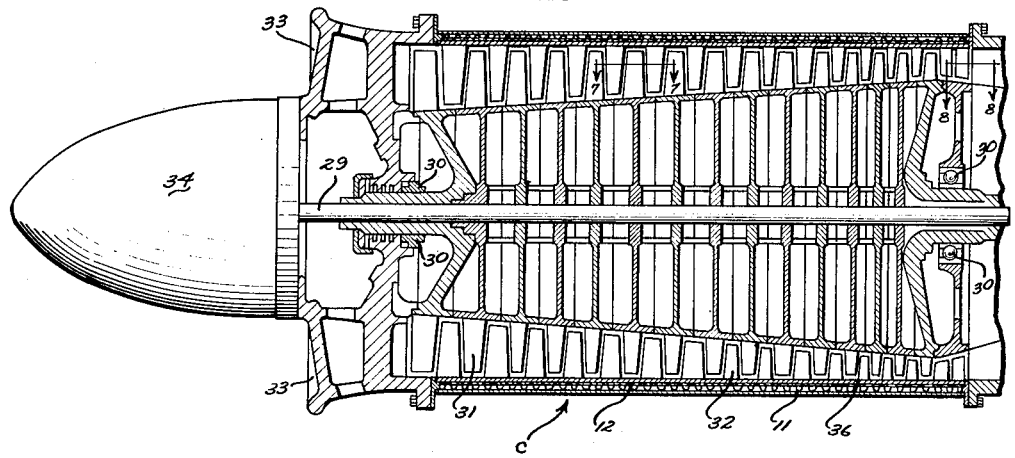
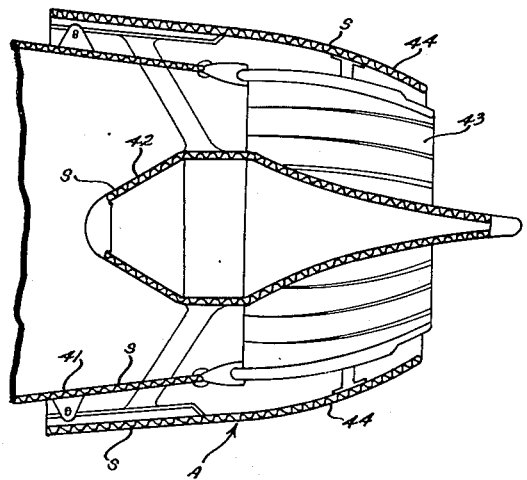
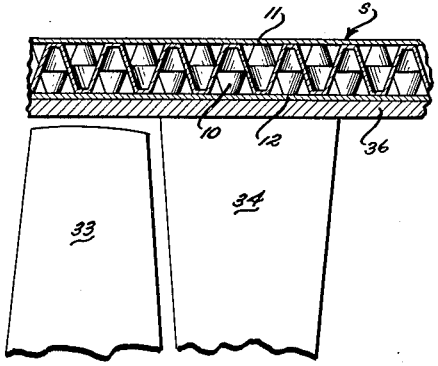
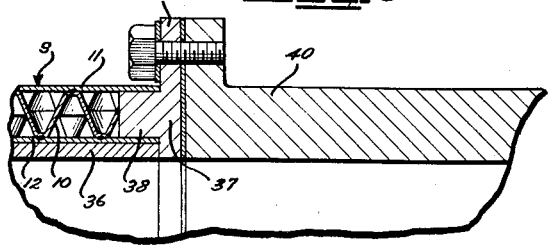
Inventor
WILLIAM A. COMPTON

United States Patent Office 3,013,641
Patented Dec. 19, 1961

3,013,641
STRUCTURAL ELEMENT
William A. Compton, Euclid, Ohio, assignor to Thompson Ramo Wooldridge Inc., a corporation of Ohio
Filed Apr. 29, 1957, Ser. No. 655,707
3 Claims. (Cl. 189—34)

The present invention relates to a structural element and more particularly relates to a composite multi-layer structural element utilizing an intermediate cellular or dimpled sheet of material that is fastened to and enclosed between two sheets of material to form a composite structural element assembly.

In the past, various built-up or composite structural elements have been proposed as a solution to the high-strength lightweight qualifications generally required in this type of construction, but such elements were either difficult to manufacture, expensive to produce, or did not lend themselves to various applications without the use of special assembly and fastening techniques. Consequently, usage of the built-up or composite type of structural element was limited to special applications where considerations of lightweight and high-strength were paramount and production costs and installation difficulties were not controlling considerations.

The structural element of the present invention offers a solution to many of the problems normally encountered in the utilization of this type of element, in the form of an improved structural element that is lightweight, strong, readily fabricated and formed into various shapes and that is economical to manufacture.

Briefly described, the present invention generally contemplates a laminated or multi-layer construction in which an intermediate laminate of cellular material is fastened between an enclosing pair of sheets or plates to form a laminated composite assembly.

The central cellular sheet is preferably formed with a series of closed ended cells or dimples arranged in aligned rows and columns and alternately projecting from either side of the planar base portion of the sheet, such that an individual cell or dimple is surrounded by one or more, and preferably four adjacent cells or dimples that project away from the base portion of the sheet in an opposite direction to the reference cell or dimple. The cells may have any desired cross-sectional configuration, but preferably are of a closed ended frusto-conical shape, and are arranged on the central laminate so that the circular edges of the base circumferences of the cells are tangent to each other at said planar base portions of the sheet.

The enclosing sheets or plates are connected to the intermediate sheet along the closed ended apexes of the alternately projecting cells, on either side of the intermediate sheet, by conventional fastening techniques, such that the assembled composite structure is united into a rigid lightweight structure. The intermediate sheet maintains the enlosing sheets in spaced relation from each other, thus in effect to form an open multicellular construction having a plurality of intercellular air spaces that may be filled with a matrix of low melting point thermoplastic material to facilitate bending and forming of the assembled composite element without collapsing the enclosing sheet material walls. The open multi-cellular construction also permits the circulation of a suitable coolant between the cells to prevent a transfer of thermal energy between the outer enclosing sheets and thus convert the structural element into an effective insulator or heat exchanger, when the element is used in an environment where the element will be subjected to high temperature differentials between the outer enclosing sheets.

A feature of the present invention is its open multicellular construction which provides its high-strength, lightweight, ready formability and heat insulating characteristics.

Another feature of the invention is its adaptability for use in an extremely high-temperature differential environment.

Still another feature of the invention is its convertibility into a heat exchanger element to thus prevent excessive heat transfer between the outer and inner enclosing sheets.

It is an object of the present invention to provide an improved structural element.

Another object of the present invention is to provide an improved structural element that is strong, lightweight, and readily formed, and that is simple and economical to manufacture.

A further object of the present invention is to provide an improved structural element that utilizes a cellular or dimpled sheet of material that is enclosed and connected to a pair of generally flat or smoothly arcuate sheets of material at the apexes of the cells to thus form an open passaged multi-cellular construction.

Still another object of the present invention is to provide an improved structural element that utilizes a spaced three layer composite laminated type construction, in which the central laminate of material is formed with a plurality of closed ended, frusto-conically shaped, symmetrically arranged cells or dimples that alternately project on either side, such that the outer enclosing sheets of material may be fastened to the apexes of the cells or dimples.

Still another object of the present invention is to provide an improved three layer composite structural element construction in which the intermediate member is formed with a series of closed ended frusto-conically shaped cells or dimples that are symmetrically arranged in rows and columns and alternately projecting on either side of the member, such that an adjacent pair of cells or dimples are tangent or coplanar to each other at their base portions and the conical side walls of one cell or dimple substantially forms a linear continuation of the conical side wall of an adjacent cell or dimple.

Many other objects and advantages of the present invention will become manifest to those versed in the art upon making reference to the detailed description and accompanying sheets of drawings that form a part of this specification and in which like reference letters and numerals are used to identify identical parts.

In the drawings:

FIGURE 1 is a fragmentary plan view of my invention, with portions thereof removed to show underlying portions;

FIGURE 2 is an enlarged cross-sectional view of the intermeidate portion of the structure of FIGURE 1, showing the symmetrical arrangement of the alternately projecting frusto-conically shaped dimples and the tangential relationship of the base portions of the dimples;

FIGURE 3 is a view similar to FIGURE 2, but showing the asembled relationship of the invention when the outer sheet members are secured to the apexes of the alternately projecting closed ended frusto-conical dimples;

FIGURE 4 is a view similar to FIGURE 3, but diagrammatically showing the manner in which a coolant may flow through the intercellular space between the outer enclosing sheets of material when the invention is being utilized as a heat exchanger;

FIGURE 5 is a somewhat diagrammatic view, showing the structural element of the invention utilized as the airfoil, skin or covering for a typical aircraft wing, and in which a separate heat exchanger, pump and thermal sensing device are provided to circulate coolant through the intercellular space of the skin;

FIGURE 6 is a diagrammatic view, partly in longitudinal section, of a typical turbojet engine compressor, showing another application of the invention;

FIGURE 7 is a fragmentary cross-sectional view of a portion of the compressor assembly of FIGURE 6 taken substantially along the line 7—7;

FIGURE 8 is a fragmentary sectional view taken substantially along the line 8—8 of FIGURE 6, showing a typical edge abutting connection of the invention to an adjacent part; and FIGURE 9 is a fragmentary, partly diagrammatic longitudinal sectional view of a typical variable area afterburner exhaust nozzle, showing still another application of the structural element of the invention.

*As shown on the drawings*

In FIGURES 1 and 3, the structural element assembly of the invention is designated generally by the reference letter S, and includes an intermediate cellular or dimpled sheet member 10, and an enclosing pair of flat sheet members 11 and 12, respectively, that are fastened on either side of the dimpled sheet member 10, to provide a spaced multi-layer arrangement of the sheets.

As best shown in FIGURES 1 and 2, the central sheet member 10 has a reference planar portion 13 in which a plurality of cells or dimples 14 are formed, that project away the reference planar portion 13. The cells may have any desired arrangement and configuration, but are preferably arranged in aligned rows and columns (FIGURE 1), and formed with a frusto-conical cross-section configuration 16 (FIGURES 2 and 3), having conically tapering side wall portions 17 and flattened closed ended apex portions 18. The cells 14 may be formed in only one side face portion of the sheet 10, but preferably alternately project away from the reference planar portion 13, such that a reference convex cell 14a will be surrounded by four equidistant symmetrically spaced concave adjoining cells 14b that project away from the reference planar portion 13 on the opposite side of the sheet 10.

Thus the enclosing flat sheet members 11 and 12, will engage the intermediate sheet member 10 along the apexes 18 of the cells and will thus be maintained in spaced relation in an amount equal to twice the altitude of the frusto-conically shaped cells 14, when the sheet 10 is formed as illustrated in FIGURES 1 and 3, and by half this distance when the cells 14 project from only one side face of the sheet 10. It should be understood that only one enclosing sheet member could be secured to the central sheet member 10, either at the apexes 18 of the cells, or along the reference planar portion 13, depending upon a particular use and application of the invention.

As most clearly shown in FIGURE 2, an adjacent pair of cells 14a and 14b have their base portions tangent to each other at the reference planar portion 13 of the sheet 10, such that the convex conical side walls 17 of a reference cell 14a forms a direct linear continuation of the corresponding side walls 17 of an adjacent concave cell 14b, that projects away from the reference planar portion 13 on the opposite side of the sheet 10. Thus a reference cell 14a projecting on one side of the sheet member 10 serves to directly transmit stresses through its conical side walls 17 to the corresponding conical side walls 17 of an adjacent cell 14b, or series of cells, on the opposite side of the reference planar portion 13 of the sheet 10. In this way, stress concentrations around a single cell 14a are eliminated in the structural element assembly S, and large forces can be withstood without the danger of failure or buckling of the assembly.

As shown in FIGURE 2, the conical side wall portions 17 of the cells 14 preferably are formed with an included angle of 60°, relative to the reference planar portion 13, though it should be understood that any other angle of taper could be utilized instead, or that some other cross-sectional shape could be utilized instead of a frusto-conical shape, as for example a hemispherical or cylindrical shape.

It will further be appreciated that by forming the sheet 10 such that adjacent cells alternately project away from either side of the reference planar portion 13, the assembled structural element assembly S will be more rigid as well as providing a greater intercellular space 19 between the enclosing sheet members 11 and 12, through which a fluid medium may be circulated to effect a heat transfer therebetween, as will be explained in more detail as the description proceeds.

The cellular sheet member 10 may be formed from any suitable structural material having the desired strength, formability and corrosion-resistant properties, as for example steel, aluminum or plastic, that will permit its being formed into the frusto-conically shaped cross-sectional configuration 16, illustrated in FIGURE 2, by conventional metal working techniques, such as stamping or rolling.

The enclosing flat sheet members 11 and 12 may similarly be formed of any desired material having the desired strength, temperature and corrosion-resistant properties, as required by the operating conditions contemplated for the structural element assembly S. The sheet members 11 and 12 are fastened to the apexes of the central sheet member 10 as at 15, by conventional fastening techniques, as for example brazing or welding, to thus provide the open multicellular construction of the invention.

To this end, the structural element assembly S may be assembled by juxtapositioning the enclosing flat sheet members 11 and 12 on either side of the cellular sheet member 10, filling the intercellular spaces between the sheet members with a suitable brazing material, and thereafter placing the composite assembly into an oven preheated to brazing temperature until the intermediate cellular sheet member has become fused to the enclosing flat sheet members 11 and 12. The surplus brazing material may thereafter be removed from the assembled structural element assembly S, such as by draining the heated brazing material, thus leaving the open multicellular construction of the invention with its corresponding features and advantages.

It should be understood that in some particular applications of the structural element assembly S, it may be desirable to use special materials or metals to form the enclosing flat sheet members 11 and 12, respectively, having extremely high-strength, temperature and corrosion-resistant properties, as for example stainless steel, titanium and vanadium or their alloys, where the structural element assembly S will be subjected to extreme loads, temperature differentials and corrosion forces, such as might be encountered in supersonic aircraft and missiles.

The open multicellular construction utilized in structural element assembly S thus not only provides the lightweight, high-strength characteristics desired, but also permits the structural element assembly S to be used as a heat exchanger in that a suitable coolant may be circulated through the intercellular space 19 (FIGURE 4) when the structural element assembly S is subjected to large temperature differentials existing on either side of the enclosing sheet members 11 and 12. The structural element assembly S may thus be advantageously used as the skin or covering on critical zones in supersonic aircraft and missiles, where localized skin friction heating would otherwise result in damage to the aircraft and possible structural failure.

As shown in FIGURE 4, the intercellular space 19 of the structural element assembly S may be filled with a fluid 20, as for example, an inert gas or a portion of the fuel supply of the aircraft, that is circulated through the intercellular space 19 when the structural element assembly S is to function as a heat exchanger, and which may be pressurized to prevent collapse or buckling of the outer enclosing sheet member as a result of skin friction heating and aerodynamic forces acting on the structural element assembly S and the aircraft. The pressurized medium in the intercellular spaces 19 will thus serve to reinforce the outer enclosing sheet member by uniformly distributing the aerodynamic forces acting on the outer enclosing sheet to the cooler and stronger inner enclosing sheet, while at the same time preventing an excessive transfer of thermal energy to inner enclosing sheet and interior of the aircraft, thereby to extend the operation of the aircraft into speed ranges that would otherwise result in failure or substantial structural weakening of the skin and damage to internal components.

In addition to providing a flow passage for a cooling and stress distributing fluid 20, the intercellular space 19 is also effectively utilized to permit the structural element assembly S to be formed into various shapes without the danger of disassociation of the enclosing sheets 11 and 12 from the apexes 18 of the intermediate cellular sheet member 10, or a localized reduction in the spacing of the sheets 11 and 12, along a bend line. This result is achieved by first filling the spaces 19 with a matrix of suitable liquefied thermoplastic material before the forming operation and while the structural element assembly S is in sheet form, as for example Ceraban. When the thermoplastic material has solidified in the intercellular spaces 19, the structural element assembly S, together with the infused reinforcing matrix of thermoplastic material, may be formed or shaped as a solid sheet without internal disassociation of the sheets or change in wall thickness. The formed assembly S is thereafter heated to allow the thermoplastic matrix material to liquefy and run out of the intercellular spaces 19, to thus leave the formed structural assembly S in its original open cellular condition.

Thus it will be appreciated that the structural element assembly S provides a novel structural element that is strong, lightweight, simple to manufacture and form, economical to produce, and that is adaptable to function as a heat exchanger and thus permit its operation in an extremely high-temperature environment.

Referring now more particularly to FIGURE 5, the structural element assembly S is illustrated as forming the skin or covering 21 of a typical aircraft wing structure W, and in which its heat exchanger characteristics are utilized to minimize heat transfer to the interior of the wing as a result of supersonic skin friction heating.

The aircraft wing W includes a leading edge portion 22, a trailing edge portion 23, a lower surface 24 and an upper surface 26. In order to most advantageously exploit and effect the heat exchanger characteristics of the structural element assembly S, when utilized as the skin or covering 21 of the aircraft wing W, a temperature-sensing device or thermocouple T is provided, that may be positioned on the leading edge portion 22 of the airfoil, to sense critical temperatures and activate the system. A pump P is provided to circulate a coolant through the intercellular spaces 19 in the skin 21, when a temperature responsive control device C activates the pump P in response to a signal from the temperature-sensing device T. A heat exchanger H serves to intercool heated coolant that is withdrawn from the intercellular spaces 19 at the trailing edge 23 of the airfoil through a suitable coolant conduit 28a, which returns the coolant to the leading edge portion 22 of the airfoil. A temperature-sensing signal conduit 28b is employed to transmit the control signal from the temperature-sensing device T to the control device C, that activates the pump P.

The heat exchanger H may be located in the wing W, or at some other point in the aircraft, and could be eliminated from the circuit in some instances, where natural conduction cooling is sufficient to maintain the recirculating coolant at an efficient level.

It should be understood however that in some applications, the heat exchanger H may beneficially be omitted from the cooling fluid circuit, and that in other instances more than one heat exchanger may be employed to effectively reduce the temperature of the coolant.

In operation, when the aircraft has reached an air speed sufficiently high to raise the temperature of the leading edge portion 22 of the wing W to a predetermined critical value, the temperature-sensing device T will emit a signal to the temperature responsive control C, to activate the coolant pump and initiate a flow of coolant through the intercellular spaces 19 in the skin or covering 21. The coolant will enter the intercellular spaces 19 at the leading edge portion 22 of the wing W, at selected points thereon, and then be dispersed through the skin toward the trailing end 23 of the airfoil, where it is withdrawn from the intercellular space 19. The coolant may then be intermediately circulated through the heat exchanger H and pump before it re-enters the skin 21 at the leading edge portion 22 of the wing to complete a cooling cycle.

Thus it will be appreciated that in the application of the structural element assembly S to the skin or covering 21 of the aircraft wing W, the open multicellular construction of the invention is effectively utilized to not only provide an extremely strong and rigid covering for the wing, but also to permit the circulation of a suitable coolant through the hollow skin interior to thus cool the temperature critical leading edge portion 22 of the wing, or other portions of the aircraft that would otherwise be adversely affected by supersonic skin friction heating.

Referring now more particularly to FIGURES 6 and 9, a typical turbojet engine compressor assembly C (FIGURE 6) and a variable area after-burner exhaust nozzle assembly A (FIGURE 9) is illustrated, in which the structural element assembly S of the invention has been utilized in the construction of each of these components.

The turbojet engine compressor assembly C generally includes a rotor shaft 29 that is rotatably journaled in bearing assemblies 30 carrying a compressor rotor blade assembly 31, a compressor stator blade assembly 32, a compressor inlet 33 and a nose cone or bullet 34. The compressor stator blade assembly 32 is carried by a cylindrical shell member 36, that is enclosed by a sleeve or jacket of material constructed according to the principles and configuration of the structural element assembly S, to both strengthen and rigidify the cylindrical shell member 36, as well as performing the heat exchanging function previously described.

As best shown in FIGURE 7, an enlarged cutaway portion of the turbojet engine compressor assembly C is illustrated, in which the structural element assembly S is utilized as a structural reinforcing and heat exchanging element around the stator blade carrying shell member 36. The structural element S thus forms a hollow double-walled compressor assembly shell, that is substantially as strong as the more conventional solid wall construction, but is considerably lighter in weight, and by virtue of its open cellular construction is capable of dissipating heat from the compressor at a more rapid rate.

In FIGURE 8, a typical edge juncture construction for the attachment of the structural element assembly S to adjacent components is illustrated. The edge juncture utilized in FIGURE 8 is particularly adapted for an installation of the structural element S around a turbojet engine compressor assembly C, but could be used in many other applications where a sealed edge juncture is required.

The edge juncture illustrated in FIGURE 8, generally includes an annular abutment member 37 having a pilot portion 38 that is formed with a width generally equal to the width of the spacing between the enclosing sheet members 11 and 12, such as will permit a snug fitting engagement when inserted therebetween. The intermediate cellular sheet member 10 is desirably marginally recessed to accommodate insertion of the pilot portion 38. The annular abutment member 37 may also be formed with a radial flanged portion 39 to facilitate its attachment to an adjacent component 40 by a suitable fastener. The pilot portion 38 of the abutment member 37 will thus serve to anchor the structural element S in position and form an effective seal to prevent the escape of fluid from the intercellular space 19, when the element is functioning as a heat exchanger. To this end, the pilot portion 38 may be fastened to the enclosing edge portions of the sheet members 11 and 12, by conventional fastening techniques, such as brazing or welding, where a fluid tight joint is desired.

Thus it will be appreciated that the abutment member 37 will provide a convenient attachment point for the structural element assembly S to an adjacent component as well as to effectively seal the edges of the assembly against fluid leakage when a coolant or pressurizing medium is introduced into the intercellular spaces.

It should be understood that the abutment member 37 may be formed with more than one pilot portion 38 to thus form a common edge juncture point for one or more sheets of material embodying the construction of the structural element assembly S.

The typical turbojet engine variable area after-burner exhaust nozzle assembly A illustrated in FIGURE 9, generally includes an exhaust nozzle section 41, tail cone 42, exhaust nozzle doors 43 and an extensible hood assembly 44. As clearly shown in FIGURE 9, the structural element assembly S may be advantageously employed in the construction of many of the components of the variable area after-burner exhaust nozzle assembly A, due to its high-strength, lightweight and heat dissipation characteristics, provided by the open celled multi-layer construction.

It will thus be appreciated that while the structural element assembly S of the invention is particularly adaptable for use in aircraft, it may also find ready application in many and varied usages where a high-strength, lightweight structural element is required that may be subjected to extreme temperature differentials for operation as an insulator or heat exchanger.

While I have illustrated only one specific embodiment of the invention, it should be understood that modifications and variations may be effected without departing from the scope of the novel concepts herein disclosed.

I claim as my invention:

1. A composite structural element assembly comprising a core element formed from an inner sheet member having a plurality of conically shaped hollow cells integral therewith and projecting therefrom, each cell having a circular base portion in the plane of said inner sheet member and a projecting end portion, said cells alternately projecting on either side of inner sheet member with cells on one side of the sheet member having their base portions tangent to base portions of cells on the other side of the sheet member in the plane of said sheet member, an outer sheet member fastened to the projecting end portions of the cells which project on one side of said inner sheet member, and another outer sheet member fastened to the projecting end portions of the cells which project on the opposite side of said inner sheet member, said core element and adjacent fastened outer sheet members together forming a unitary assembly.

2. A composite structural element assembly comprising a core element formed from an inner sheet member having a plurality of frusto-conically shaped hollow cells integral therewith and projecting therefrom, each cell having a circular base portion in the plane of said inner sheet member and a projecting end portion, said cells alternately projecting on either side of said inner sheet member with the cells on one side of the sheet member having their base portions tangent to base portions of cells on the other side of the sheet member in the plane of said sheet member, an outer sheet member fastened to the projecting end portions of the cells which project on one side of said inner sheet member, and another outer sheet member fastened to the projecting end portions of the cells which project on the opposite side of said inner sheet member, said core element and adjacent fastened outer sheet members together forming a unitary assembly.

3. A composite structural element assembly comprising a core element formed from an inner sheet member having a plurality of hollow cells embossed thereon, each cell having a base portion in the plane of said inner sheet member and a projecting end portion, said cells alternately projecting on either side of said inner sheet member with cells on one side of the sheet member having their base portions tangent to base portions of cells on the other side of the sheet member in the plane of said sheet member, an outer sheet member fastened to the projecting end portions of the cells which project on one side of said inner sheet member, and another outer sheet member fastened to the projecting end portions of the cells which project on the opposite side of said inner sheet member, said core element and adjacent fastened outer sheet members together forming a unitary assembly.

References Cited in the file of this patent
UNITED STATES PATENTS

| | | |
|---|---|---|
| 1,784,511 | Carns | Dec. 9, 1930 |
| 2,145,678 | Backstrom | Jan. 31, 1939 |
| 2,391,997 | Noble | Jan. 1, 1946 |
| 2,477,932 | King | Aug. 2, 1949 |
| 2,503,164 | McGuire | Apr. 4, 1950 |